(No Model.)
H. C. HUMPHREY.
LATHE CHUCK FOR TURNING POLYGONAL BODIES.
No. 255,080. Patented Mar. 14, 1882.
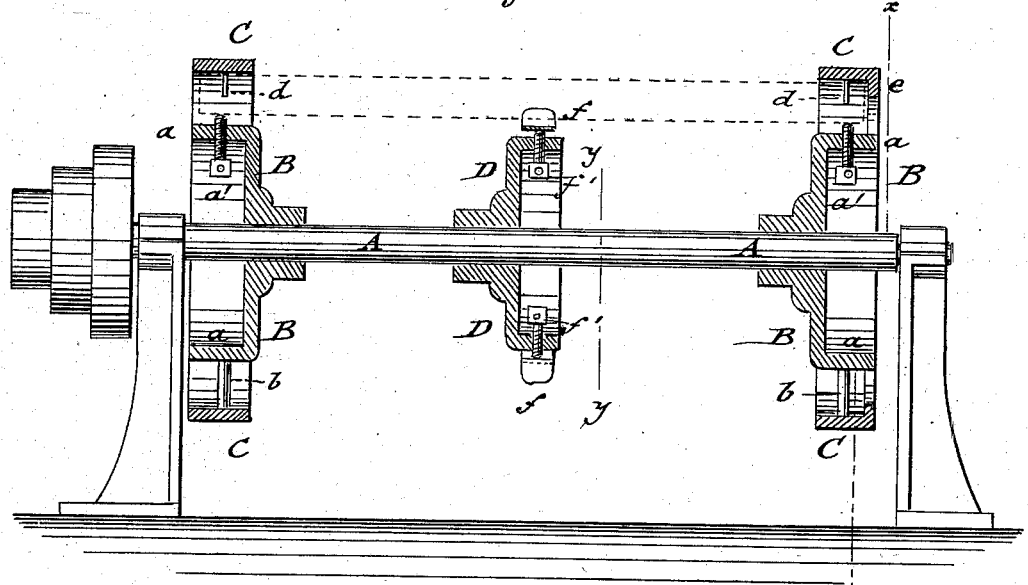
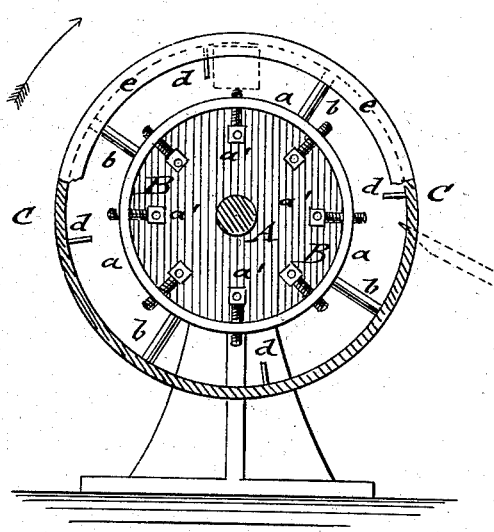
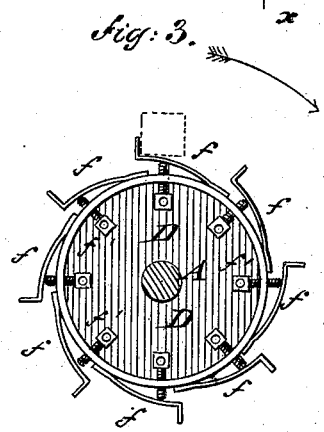
WITNESSES:
INVENTOR
Henry Clay Humphrey
BY Paul Goepel
ATTORNEY

UNITED STATES PATENT OFFICE.

HENRY C. HUMPHREY, OF NEW YORK, N. Y., ASSIGNOR OF THREE-FOURTHS TO SIEGFRIED BLOCK, OF SAME PLACE.

LATHE-CHUCK FOR TURNING POLYGONAL BODIES.

SPECIFICATION forming part of Letters Patent No. 255,080, dated March 14, 1882.

Application filed August 31, 1881. (No model.)

*To all whom it may concern:*

Be it known that I, HENRY CLAY HUMPHREY, of the city, county, and State of New York, have invented certain new and useful Improvements in Lathe-Chucks for Turning Polygonal Bodies, of which the following is a specification.

This invention has reference to certain improvements in the lathe-chuck for turning polygonal bodies for which Letters Patent have been granted to Siegfried Block, numbered 229,855, and dated July 13, 1880, so that the sticks of wood which have to be clamped to the heads of the chuck can be separately turned and secured in a more reliable manner for the cutting-tool, even if they differ somewhat in thickness.

The invention consists of a revolving spindle having laterally-adjustable heads with circumferential flanges and fixed concentric rings supported on radial stays, in connection with guide-pins of the rings and set-screws of the flanges. The fixed outer ring of one of the heads is provided with a rectangular flange, against which the sticks are pushed up before being clamped. Intermediately between the heads are arranged one or more flanged disks with annular supporting-strips and set-screws for bracing the sticks at an intermediate point or points.

In the accompanying drawings, Figure 1 represents a side elevation, partly in longitudinal section, of my improved lathe-chuck for turning polygonal bodies; and Figs. 2 and 3 are vertical transverse sections of the same respectively on lines $x$ $x$ and $y$ $y$, Fig. 1.

Similar letters of reference indicate corresponding parts.

A represents the spindle of my improved lathe-chuck for turning polygonal bodies, and B B are two heads or disks, of any suitable size, according to the size and number of the sticks to be turned. Either one or both of these heads are made adjustable upon the center spindle, A, so as to be laterally movable toward each other. Each head B is securely clamped to the spindle by any suitable fastening device. The heads or disks B B are provided with circumferential flanges $a$, which extend at right angles from the body of the head, said flanges carrying by means of fixed radial stays or pins $b$ an exterior ring, C, which is concentric to the flange of the head. A number of fixed guide-pins, $d$, project inwardly from the exterior ring, C, and serve as stop-pins for retaining the sticks or bodies of wood to be turned in proper position on the heads. The flange $a$ of each head is provided with a number of radial set-screws, $a'$, which correspond to the number of stop-pins and the number of sticks to be turned in the lathe-chuck. The exterior ring, C, of one of the heads B is provided at its outer edge with an inwardly-projecting rectangular flange, $e$, against which the sticks, which are inserted through the opposite head, abut, so as to be then pushed up against the stop-pins and secured by the clamping-screws.

Intermediately between the heads B B is arranged a flanged disk, D, of slightly less diameter than the heads B B, the flange of said intermediate disk, D, being provided with as many angular supporting-strips $f$ as there are sticks to be placed into the machine, said strips being attached at one end to the flange of the disk, but free at the opposite angular ends, and acted upon by means of radial set-screws $f'$, so as to be set higher or lower, as required by the thickness of the sticks, as shown in Fig. 3. When sticks of extra length have to be turned one or more additional intermediate disks, D, may be used. The intermediate disk or disks, D, are only required when long and comparatively thin sticks have to be turned, as they have to be properly braced at one or more intermediate points during the turning off of the sticks by the cutter.

The square or other shaped sticks which are to be turned on the machine are inserted between the head and that ring which has no flange, and passed over the angular strips of the intermediate disk or disks to the opposite head until the sticks abut against the shoulder of the ring of the other head at the opposite end of the machine. The sticks are then placed against the stop-pins and clamped by the set-screws. When all the sticks are thus secured in position the lathe-chuck is revolved and the sticks are turned off to the proper configuration at the outer side. They are then turned around their axis by loosening the set-screws and clamped again in position for turning the second side, and so on until all the sides are turned off to the proper shape.

The advantages of my improved lathe-chuck are, first, the sticks are not required to be absolutely of the same thickness; secondly, larger or smaller, longer and shorter, sticks can be made on the same machine by adjusting the set-screws and heads; and, lastly, the turning of the sticks around their axis is accomplished without difficulty and without any auxiliary devices, which were necessary in the lathe-chucks heretofore used before the remaining sides could be turned off.

Having thus described my invention, I claim as new and desire to secure by Letters Patent—

1. In a lathe-chuck for turning polygonal bodies, the combination of a revolving center spindle, having laterally-adjustable flanged heads, with fixed exterior concentric rings secured thereto, said rings having stop-pins and the heads radial set-screws for securing the sticks, substantially as and for the purpose set forth.

2. The combination of the head B, having a circumferential flange, $a$, and radial set-screws $a'$, with a concentric ring, C, secured thereto, said ring having inwardly-projecting stop-pins $d$, substantially as set forth.

3. The combination of a revolving spindle and flanged laterally-adjustable heads, provided with means for attaching the sticks, with one or more flanged disks arranged intermediately between the heads and being made of less diameter than the same, said disks having angular strips and set-screws below said strips for supporting the sticks at one or more intermediate points, substantially as specified.

4. In a lathe-chuck for turning polygonal bodies, the intermediate disks, D, having a circumferential flange, with radial set-screws $f$ and exterior angular strips, $f'$, which are attached at one end to the flange and adapted to be set to the sticks by their outer angular ends, substantially as set forth.

5. In a lathe-chuck for turning polygonal bodies, the combination of the head B at one end of the spindle, said head having a circumferential flange, $a$, and radial set-screws $a'$, with an exterior concentric ring, C, having inwardly-extending stop-pins $d$ and a rectangular stop-flange, $e$, at the outer edge, as and for the purpose set forth.

In testimony that I claim the foregoing as my invention I have signed my name, in presence of two witnesses, this 22d day of August, 1881.

HENRY CLAY HUMPHREY.

Witnesses:
PAUL GOEPEL,
CARL KARP.